Feb. 7, 1933. W. E. GOLDSBOROUGH ET AL 1,897,003
MEANS AND METHOD OF COATING ARTICLES WITH REFRACTORY
Filed Feb. 11, 1929 2 Sheets-Sheet 1

Inventors
Winder E. Goldsborough
Russell E. Lowe
By their Attorney
Edmund G. Borden Feb. 7, 1933. W. E. GOLDSBOROUGH ET AL 1,897,003
MEANS AND METHOD OF COATING ARTICLES WITH REFRACTORY
Filed Feb. 11, 1929 2 Sheets-Sheet 2
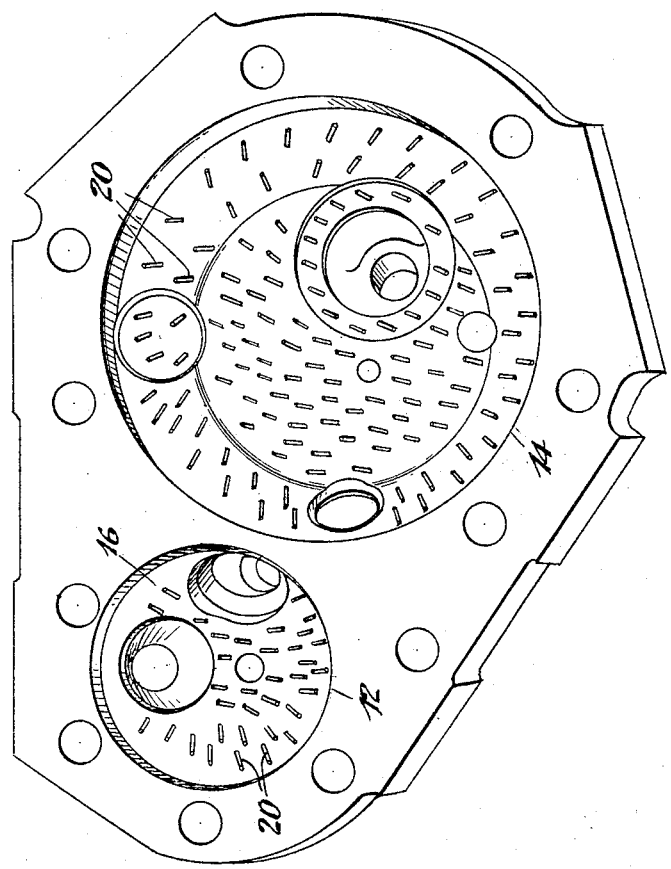
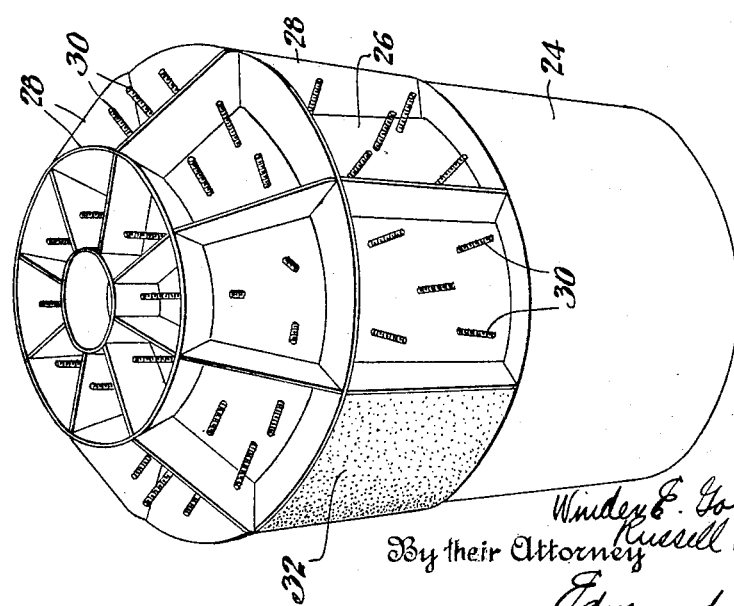
Inventors
Wilder E. Goldsborough
Russell E. Lowe
By their Attorney
Edmund G. Borden Patented Feb. 7, 1933

1,897,003

UNITED STATES PATENT OFFICE

WINDER E. GOLDSBOROUGH, OF SOUTH NORWALK, CONNECTICUT, AND RUSSELL E. LOWE, OF NEW YORK, N. Y., ASSIGNORS TO DOHERTY RESEARCH COMPANY, OF NEW YORK, N. Y., A CORPORATION OF DELAWARE

MEANS AND METHOD OF COATING ARTICLES WITH REFRACTORY

Application filed February 11, 1929. Serial No. 339,029.

This invention relates to a means and method of coating metallic surfaces with refractory material, and has for its object to provide a construction in which the refractory material will be so firmly affixed to the metallic surface as to be able to maintain its bond therewith, even under the extremely high temperature and pressure conditions present in modern internal combustion and other types of heat motors.

In engines of the conventional type the heat losses to the cold walls of the cylinder and piston absorb a considerable part of the heat of the fluids expanding therein. The loss of this heat considerably reduces the thermal efficiency of the engine from that which should theoretically be obtainable. To avoid this heat loss it has heretofore been proposed to heat insulate the combustion space of the engine, and many attempts have been made to find a refractory which would withstand the rapid temperature and pressure changes in such engines.

Of recent years refractories capable of withstanding extremely high temperature and pressure changes have been developed. These refractories have been applied to the inner surface of internal combustion engines by covering the same with the mixed aggregate of which the refractory is composed and then baking or firing the whole to cause the aggregate to set. The refractory when thus fired in position has a firm bond with the metallic base, and when the proper aggregate has been used there is an intimate bond between the metallic surface and the refractory, caused either by chemical union between some constituent of the refractory and the metal or by an alloying or fusing of the two substances. There is thus, through either of these causes or both acting simultaneously, an inner penetration of the refractory and metal along the contacting surface. Such a process has been fully described in copending application Serial No. 756,407.

It is an object of this invention to further improve the bond between the refractory and metal by providing an increased surface area to which the refractory may adhere or be united. Such increased surface is provided by forming projections on the surface of the substance to be coated, which projections preferably are rough surfaced by threading or otherwise. These projections provide surfaces substantially perpendicular to the surface from which they project and which are therefore capable of reenforcing the refractory as well as providing a bonding surface which opposes lateral or shearing stresses.

A further object of this invention is to divide the refractory coated surfaces into relatively small sections whereby they may be better protected against breakage and also permit a certain amount of expansion in the metal backing without disrupting the refractory.

To this end, the surface to be coated is divided into a plurality of segments by means of strips of metal or other substances, which strips are welded or otherwise firmly affixed to the surface coated and which project from said surface to a distance preferably equal to the depth of the refractory coating. This division of the refractory into segments increases the strength and durability of the refractory and provides a still firmer bond with the metal backing.

These and other objects of the invention will be further described in connection with the accompanying drawings, in which:

Fig. 2 is a perspective view of a piston which has been constructed to receive a coat of refractory material, and to a portion of which such refractory has been applied; and Fig. 3 is a view similar to Fig. 1 showing the internal walls of a cylinder head before refractory material has been applied.

Figure 1:
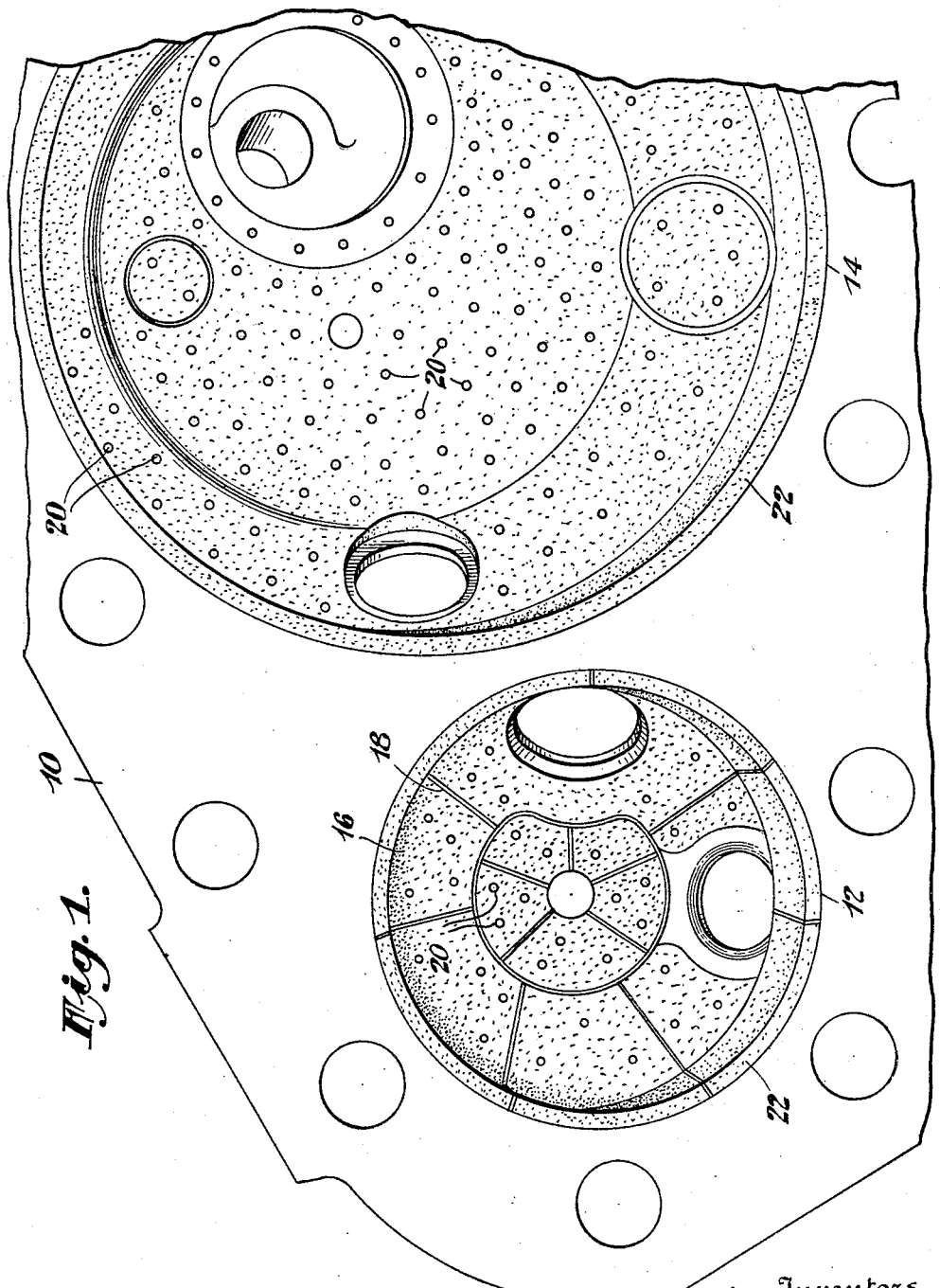
Fig. 1 is a perspective view of a portion of a cylinder block of a multiple expansion engine which block has been turned upon its side to show the interior walls of the upper end of the cylinder and the cylinder head to which refractory material has been applied in accordance with this invention.

Referring particularly to Fig. 1, 10 indicates a cylinder block of a multiple expansion engine having a high pressure cylinder 12 and a low pressure cylinder 14. The high pressure cylinder 12 and a head 16 therefor have been treated in accordance with this invention by welding or otherwise affixing metallic strips 18 to the metallic walls of the cylinder 12, and similarly to the walls of the cylinder head 16. Projecting from the cylinder wall 12 and also from the wall of the head 16 are a plurality of plugs 20. The walls have been covered with a layer of refractory material indicated at 22 to a depth equal to the distance which the strips 17 and plugs 20 project from the surfaces of the walls. Cylinder 14 has been treated in a similar manner except that in this case the strips 18 have been omitted. The refractory material has been carefully packed and tamped in place to insure a tight contact with the walls of the cylinders 12 and 14 and with the plugs 20 and the sides of strips 18. The whole has then been baked at a temperature sufficient to cause the aggregate to set and then the walls have been ground and polished to form smooth surfaces.

Referring to Fig. 2, 24 indicates the piston, the upper portion of which is intended to be coated with refractory material in accordance with this invention. The upper portion 26 is therefore of a less diameter than the lower portion, and bears a number of metallic strips 28 which have been welded or otherwise firmly attached to the body portion 26. In order that the strips 28 shall form sharp corners with the surface of the piston, these strips are preferably inserted in grooves in the surface of the piston, and are substantially of the same width as the thickness of the strips. Upon welding or caulking along the edge so formed, a firm connection is made, forming a sharp corner free from such deformations as would occur if the metallic strips were directly welded to the surface. Between the segments formed by the metallic strips 28, a plurality of projections 30 similar to the projections 20 of Fig. 1 may be provided. These projections as may be seen are preferably screw-threaded so that when the refractory material is set about them, a firm hold will be obtained even where the refractory material is incapable of entering into a union with the metallic surface. At 32 is indicated a segment which has been coated with the refractory material.

It will be seen that by this formation a greatly increased surface has been provided to which the refractory may adhere, the increased surface consisting of the sides of the strips 28 and also of the surface of the plugs 30. These surfaces are substantially at right angles to the surface coated, and therefore tend to resist any shearing strains to which the refractory may be subjected along the surface of contact. Furthermore the strips 28, by dividing the surface of the coating into relatively small segments, permit a greater degree of difference between the expansion of the metallic surface and the refractory. It will thus be understood that both the plugs 30 and the strips 28 constitute additional holding means for the refractory, and while both are desirable for use together, either may be used separately. Either the plugs 30 or the strips 28 may be grooved or corrugated or otherwise roughened to still further improve the holding means. The plugs or strips may be made of a tougher and more heat resistant metal than is the base metal 26 to which the plugs and strips are affixed, in order that the measure of corrosion and distortion suffered by the metal plugs or strips due to intense heat may be made negligible.

In Fig. 3 is shown a construction similar to Fig. 1 but in which no strips 18 have been provided. In this figure the refractory has not yet been applied and the screw-threaded projections 20 may be seen projecting from the side walls of the cylinders 12 and 14, and cylinder head 16.

Although the invention has been illustrated in the accompanying drawings in connection with a reciprocating engine it will be obvious from the above disclosure that the invention is broadly useful in other relations.

Having thus described the invention what is claimed as new is:

1. The process of heat insulating the internal surfaces of a heat motor which consists in affixing a plurality of intersecting metallic strips perpendicular to said internal surfaces, packing the mixed aggregate composing a refractory material upon the surface and about said strips and baking the whole to cause said aggregate to set.

2. The process of binding refractory material to the surface of an object which consists in dividing said surface into segments by a plurality of intersecting metallic strips, packing the mixed aggregate of which the refractory is to be composed upon said surface and between said strips, and baking the article so formed at a temperature sufficient to cause said aggregate to set.

In testimony whereof the parties herein affix their signatures.

WINDER E. GOLDSBOROUGH.
RUSSELL E. LOWE.